United States Patent [19]

Porrovecchio, Sr.

[11] Patent Number: 5,885,451
[45] Date of Patent: Mar. 23, 1999

[54] OIL SPILL CONTAINMENT AND RECOVERY APPARATUS

[76] Inventor: Dennis J. Porrovecchio, Sr., 27213 Lana La., Conroe, Tex. 77385

[21] Appl. No.: 606,106

[22] Filed: Oct. 31, 1990

[51] Int. Cl.$^6$ ..................................................... E02B 15/04
[52] U.S. Cl. ........................................ 210/242.4; 210/924
[58] Field of Search ..................................... 210/671, 680, 210/691, 693, 242.4, 924

[56] References Cited

U.S. PATENT DOCUMENTS

| | | | |
|---|---|---|---|
| 3,607,741 | 9/1971 | Sohnius | 210/680 |
| 3,702,657 | 11/1972 | Cunningham et al. | 210/924 |
| 3,739,913 | 6/1973 | Bogosian | 210/924 |
| 4,519,918 | 5/1985 | Ericsson et al. | 210/680 |
| 4,615,739 | 10/1986 | Clark et al. | 106/212 |

*Primary Examiner*—Ivars Cintins
*Attorney, Agent, or Firm*—Neal J. Mosely

[57] ABSTRACT

An apparatus and method is disclosed for containment and recovery of water-insoluble liquids, e.g., oil, floating on water. The apparatus and method involves using a fibrous material coated or saturated with a composition which will absorb substantial quantities of the water-insoluble organic liquid (oil) while substantially repelling the water in which the water-insoluble organic liquid is floating. The fibrous material may be a fabric, a paper, a sponge, a sheet or a film and is coated or impregnated with an oleophylic, hydrophobic composition. Such materials as cotton, jute, hemp, wool, Rayon, Dacron, paper, polyester, and polyurethane, in various forms and combinations may be used. The composition is preferably an oil-in-water coating composition comprising an oil soluble resin or drying oil with an aqueous discontinuous phase dispersed therein, the discontinuous phase comprising an emulsion of a water insoluble resin, which coating composition passes or absorbs the water-insoluble liquid but repels water. The fibrous material impregnated or coated with an oleophylic, hydrophobic composition is passed into contact with the water-insoluble liquid (e.g. oil) whereupon the oil is absorbed and the water rejected. The oil-saturated material is recovered and the oil recovered therefrom and the fibrous material reused; reimpregnating the material with the oleophylic, hydrophobic composition, if necessary. The treated materials may also be used in industrial applications wherein the material to be absorbed does not float on water.

10 Claims, 8 Drawing Sheets

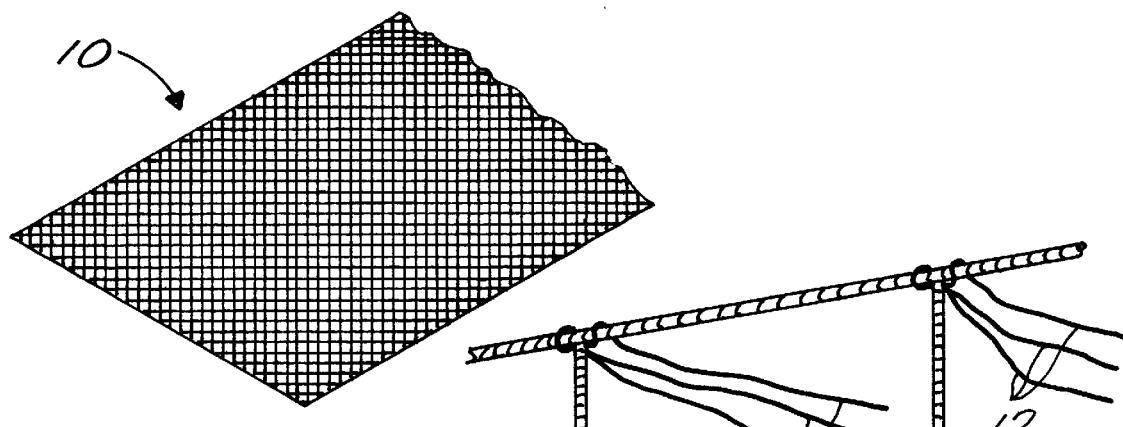
FIG. 1
FIG. 2
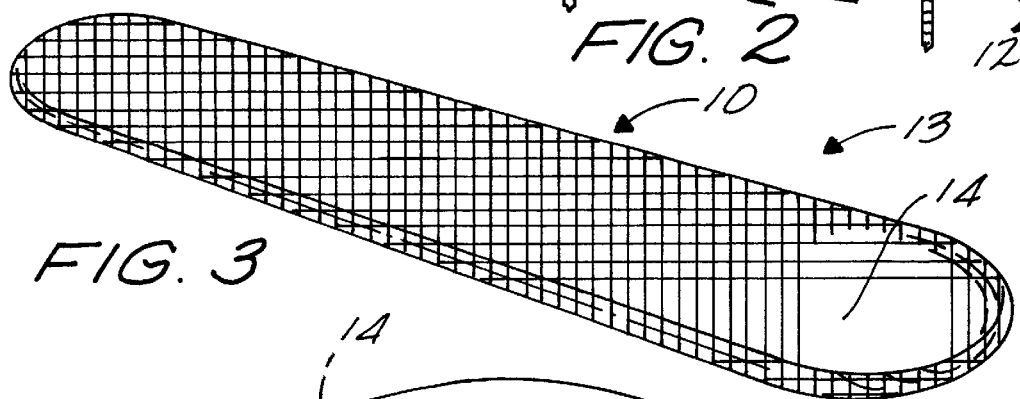
FIG. 3
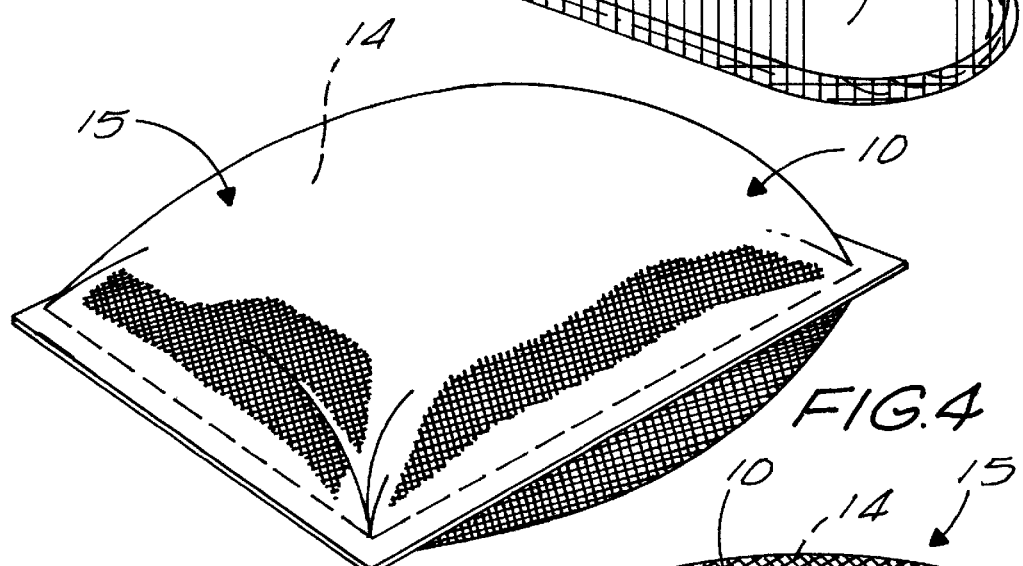
FIG. 4
FIG. 5

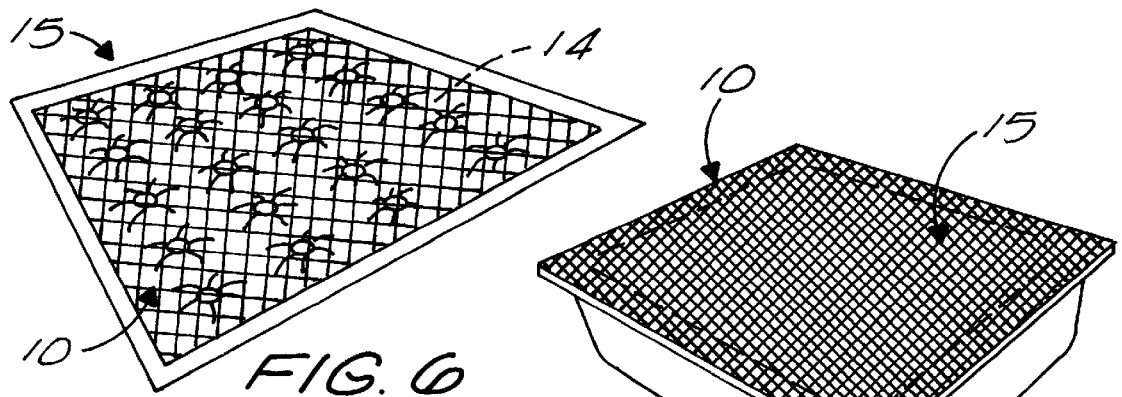
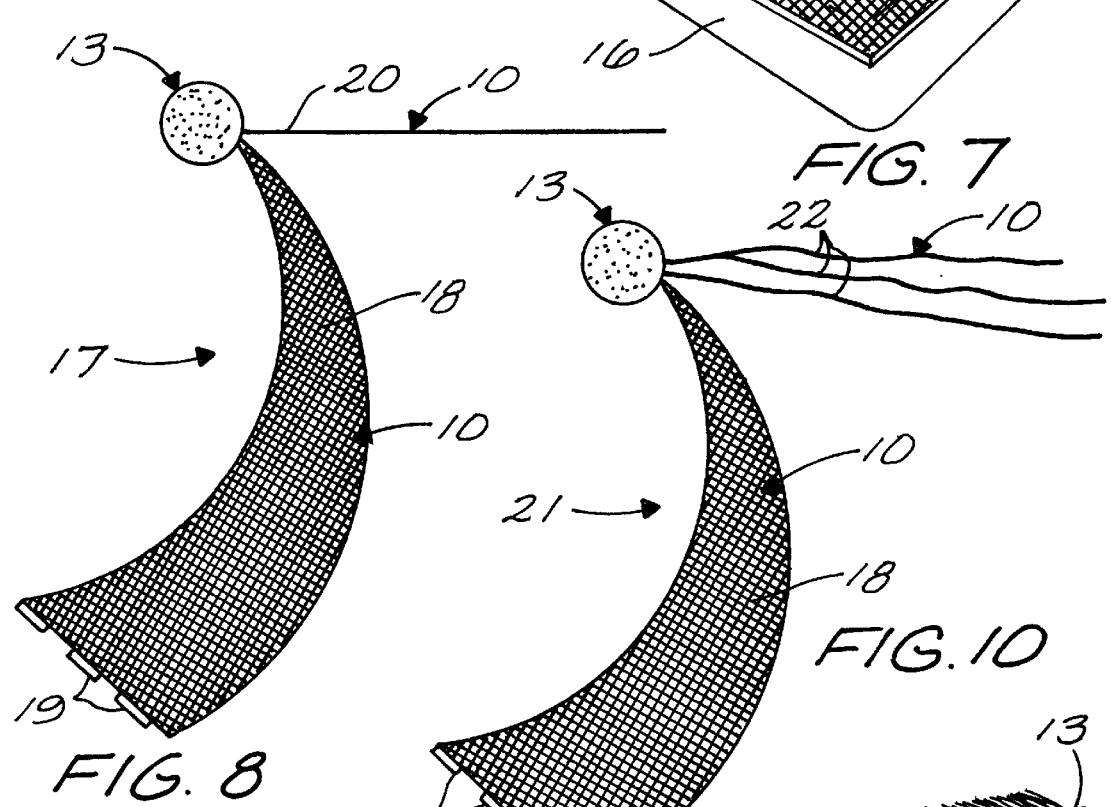
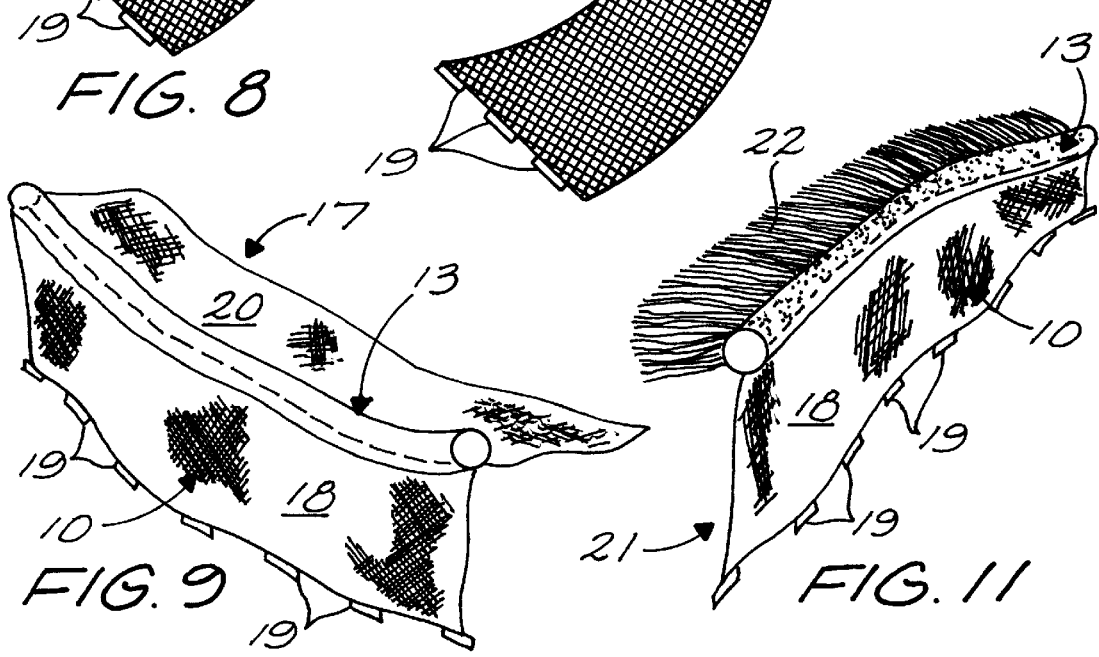

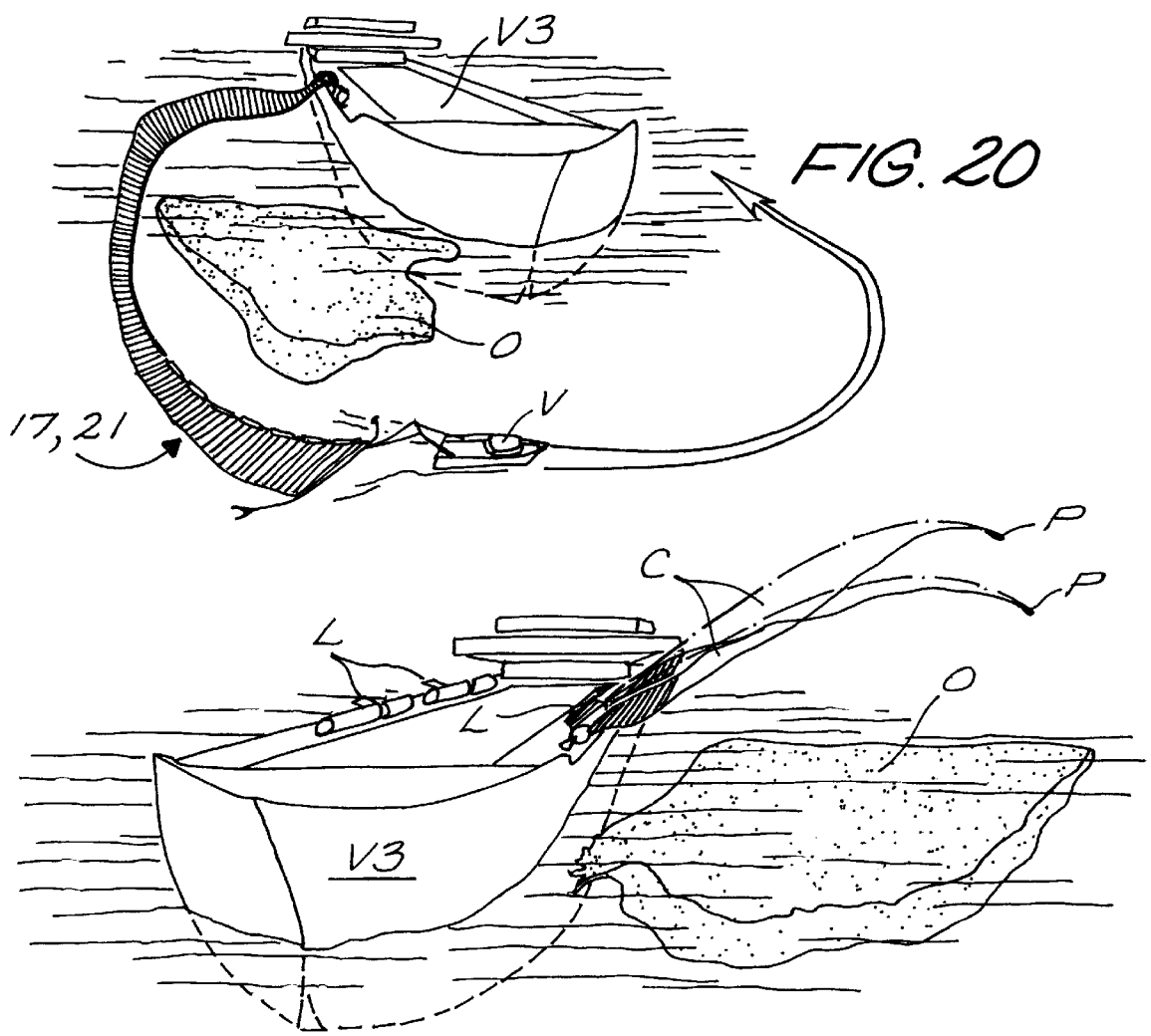
FIG. 20
FIG. 21
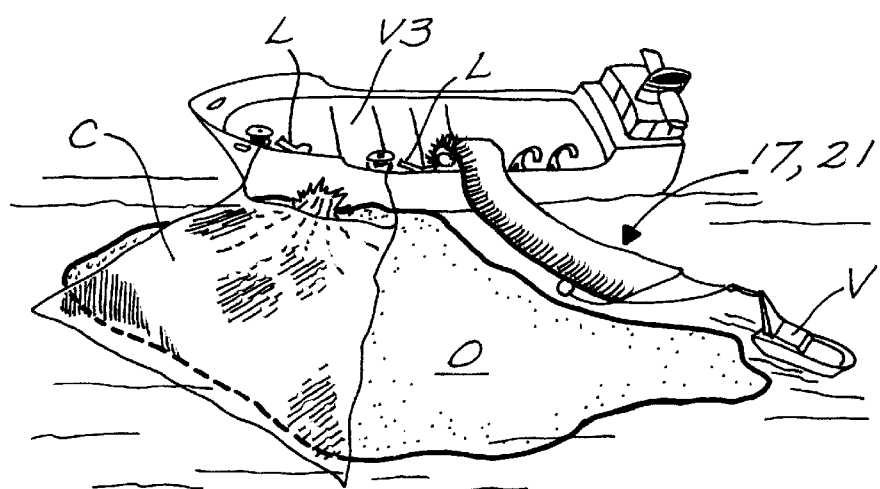
FIG. 22

OIL SPILL CONTAINMENT AND RECOVERY APPARATUS

BACKGROUND OF THE INVENTION

1. Field of the Invention

This invention relates generally to methods and apparatus for containing and recovering oil spills and the like, and more particularly to the use of fibrous woven or non-woven fabric structures having water repellent and oil absorbent qualities for absorbing, containing, and recovering water-insoluble liquids, such as fuels, petroleum products, oil, etc.

2. Brief Description of the Prior Art

The containment and recovery of petroleum products, particularly oil spills at sea is a very serious problem which often results in contamination of miles of shoreline and damage to wildlife and natural flora and fauna.

Currently, several methods are used to clean-up such spills. Surfactants have been applied to the oil which reduces its surface tension, but the oil is merely dispersed and spread in a diluted form by sea currents. Absorbent materials which are heavier than water have been used, but sink to the bottom carrying a portion of the oil with it. These methods result in the risk of spreading the damage over a greater distance.

Mechanical methods have also been used, such as booms which float on the surface of the water to encircle and contain the spill until it can be collected by pumps and skimmers which remove the oil off the surface of the water. The mechanical methods are time consuming and not efficient and their effectiveness and reliability is further reduced by turbulent seas.

Microorganisms have recently been employed in oil spill clean-ups wherein the microorganism will "digest" the oil. This is presently an experimental method and the long-term effects of the microorganisms are uncertain.

On land, such methods as washing or steam cleaning the beaches and rocks have been used. This method is time consuming, labor intensive, costly, and for the most part is ineffective.

In industries such as manufacturing plants, and refineries, leakage from pipes, valves, or machinery is a common problem. The spilled or leaked liquid presents a safety problem and often results in costly down-time.

Ceaser, U.S. Pat. No. 4,780,518 discloses an oil absorbent, water-repellent polymeric carbohydrate composition made from a number of the hydroxyl groups of carbohydrate moieties reacted with a metal/ammonium complex. The fibrous composition, in a granulated or shredded form, may be used for oil spills wherein the fibers are assembled as a mass on water with the aid of a floating boom and guided toward the floating liquid to be absorbed.

Clark et al, U.S. Pat. No. 4,615,739 discloses a water sealant chemical composition in the form of a paint, stain, or clear coating used as a waterproof coating.

The present invention is distinguished over the prior art in general, and these patents in particular by an apparatus and method for containment and recovery of water-insoluble liquids, e.g., oil, floating on water which involves using a fibrous material coated or saturated with a composition which will absorb substantial quantities of the water-insoluble organic liquid (oil) while substantially repelling the water in which the water-insoluble organic liquid is floating. The fibrous material may be a fabric, a paper, a sponge, a sheet or a film and is coated or impregnated with an oleophylic, hydrophobic composition. Such materials as cotton, jute, hemp, wool, Rayon, Dacron, paper, polyester, and polyurethane, in various forms and combinations may be used. The composition is preferably an oil-in-water coating composition comprising an oil soluble resin or drying oil with an aqueous discontinuous phase dispersed therein, the discontinuous phase comprising an emulsion of a water insoluble resin, which coating composition passes or absorbs the water-insoluble liquid but repels water. The fibrous material impregnated or coated with an oleophylic, hydrophobic composition is passed into contact with the water-insoluble liquid (e.g. oil) whereupon the oil is absorbed and the water rejected. The oil-saturated material is recovered and the oil recovered therefrom and the fibrous material reused; reimpregnating the material with the oleophylic, hydrophobic composition, if necessary. The treated materials may also be used in industrial applications wherein the material to be absorbed does not float on water.

SUMMARY OF THE INVENTION

It is therefore an object of the present invention to provide an apparatus and method for containment and recovery of water-insoluble liquids floating on water.

It is another object of this invention to provide apparatus for containment and recovery of water-insoluble liquids floating on water which will absorb substantial quantities of the water-insoluble organic liquid while substantially repelling the water in which the water-insoluble organic liquid is floating.

Another object of this invention is to provide an apparatus and method for containment and recovery of water-insoluble liquids floating on water which utilizes a fibrous absorbent fabric structure saturated with a water-repellent composition.

Another object of this invention is to provide an apparatus and method for containment and recovery of industrial leaks and spills of water-insoluble liquids which utilizes a fibrous absorbent fabric structure saturated with a water-repellent composition.

Another object of this invention is to provide an apparatus and method for containment and recovery of water-insoluble liquids floating on water which utilizes a fibrous absorbent structure saturated with a composition which passes or absorbs the water-insoluble liquid but repels water.

Another object of this invention is to provide an apparatus and method for containment and recovery of water-insoluble liquids floating on water which utilizes a fibrous absorbent structure comprising a fabric saturated with a composition which passes or absorbs the water-insoluble liquid but repels water.

Another object of this invention is to provide an apparatus and method for containment and recovery of water-insoluble liquids floating on water which utilizes a fibrous absorbent structure comprising a paper saturated with a composition which passes or absorbs the water-insoluble liquid but repels water.

Another object of this invention is to provide an apparatus and method for containment and recovery of water-insoluble liquids floating on water which utilizes a fibrous absorbent structure comprising a sponge saturated with a composition which passes or absorbs the water-insoluble liquid but repels water.

Another object of this invention is to provide an apparatus and method for containment and recovery of water-insoluble liquids floating on water which utilizes a fibrous absorbent structure comprising a sheet or film saturated with a composition which passes or absorbs the water-insoluble liquid but repels water.

Another object of this invention is to provide an apparatus and method for containment and recovery of water-insoluble liquids floating on water which utilizes a fibrous absorbent structure saturated with an oil-in-water coating composition comprising an oil soluble resin or drying oil with an aqueous discontinuous phase dispersed therein, the discontinuous phase comprising an emulsion of a water insoluble resin, which coating composition passes or absorbs the water-insoluble liquid but repels water.

Another object of this invention is to provide an apparatus and method for containment and recovery of water-insoluble liquids floating on water which is easily and quickly deployed.

Other objects of the invention will become apparent from time to time throughout the specification and claims as hereinafter related.

The above noted objects and other objects of the invention are accomplished by an apparatus and method for containment and recovery of water-insoluble liquids, e.g., oil, floating on water which involves using a fibrous material coated or saturated with a composition which will absorb substantial quantities of the water-insoluble organic liquid (oil) while substantially repelling the water in which the water-insoluble organic liquid is floating. The fibrous material may be a fabric, a paper, a sponge, a sheet or a film and is coated or impregnated with an oleophylic, hydrophobic composition. Such materials as cotton, jute, hemp, wool, Rayon, Dacron, paper, polyester, and polyurethane, in various forms and combinations may be used. The composition is preferably an oil-in-water coating composition comprising an oil soluble resin or drying oil with an aqueous discontinuous phase dispersed therein, the discontinuous phase comprising an emulsion of a water insoluble resin, which coating composition passes or absorbs the water-insoluble liquid but repels water. The fibrous material impregnated or coated with an oleophylic, hydrophobic composition is passed into contact with the water-insoluble liquid (e.g. oil) whereupon the oil is absorbed and the water rejected. The oil-saturated material is recovered and the oil recovered therefrom and the fibrous material reused; reimpregnating the material with the oleophylic, hydrophobic composition, if necessary. The treated materials may also be used in industrial applications wherein the material to be absorbed does not float on water.

BRIEF DESCRIPTION OF THE DRAWINGS

FIG. 1 is an isometric view of cloth saturated with a water-repellent solution in accordance with the present invention.

FIG. 2 is an elevation view of a portion of a net structure fashioned from water-repellent treated fibrous material.

FIG. 3 is a perspective view of a floatation boom made of water-repellent treated cloth or net fabric.

FIG. 4 is an isometric view of a mat made of water-repellent treated cloth or net fabric.

FIG. 5 is a side elevation of the mat of FIG. 4.

FIG. 6 is a perspective view of a mat made of water-repellent treated cloth or net fabric having a quilted configuration.

FIG. 7 is a perspective view of a container having a water-repellent treated cloth or mat filter covering the top.

FIG. 8 is a side elevation of a containment bib net made of water-repellent treated cloth or net material.

FIG. 9 is a perspective view of a portion of the containment bib net of FIG. 8.

FIG. 10 is a side elevation of a containment mop net made of water-repellent treated cloth or net material.

FIG. 11 is a perspective view of a portion of the containment mop net of FIG. 8.

FIG. 20 is a pictorial view illustrating an oil spill containment method whereby a ruptured or leaking vessel equipped with containment bib or mop nets contains the oil spill.

FIG. 21 is a pictorial view illustrating another oil spill containment method whereby the ruptured or leaking vessel is equipped with a net launcher which will carry the cloth or net over the top of the spill.

FIG. 22 is a pictorial view illustrating another oil spill containment method whereby the ruptured or leaking vessel is equipped with a net launcher which will carry the cloth or net over the top of section of the spill and has treated containment bib or mop nets deployed from reels on the vessel and towed by another vessel to encircle other portions of the oil spill.

DESCRIPTION OF THE PREFERRED EMBODIMENTS

Figure 12:
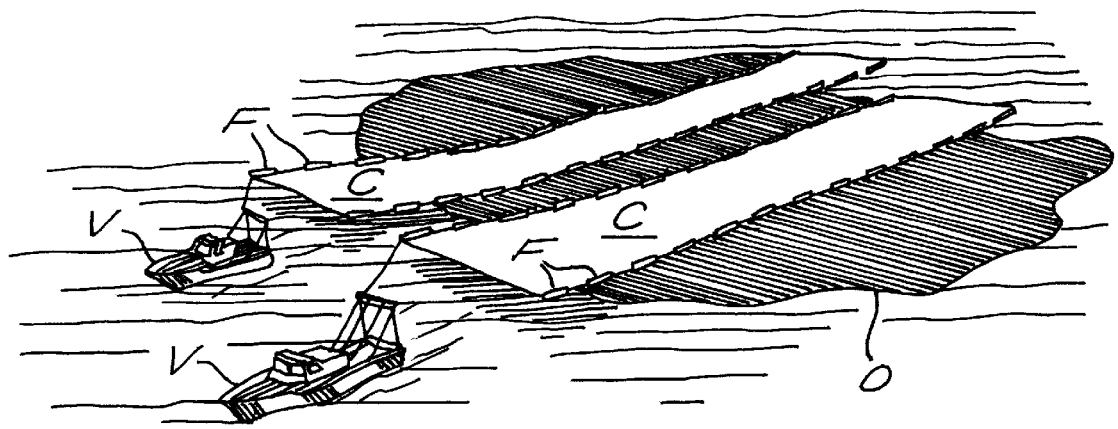
FIGS. 12 and 13 are pictorial views illustrating an oil spill containment method wherein treated cloths or nets are pulled by vessels over or through a section of floating oil.

The present invention utilizes various fibrous absorbent fabric materials saturated with a water-repellent composition which are employed to engage the surface of a water-insoluble organic liquid floating on water, as explained in detail hereinafter. The fabric structures will absorb quantities of water-insoluble organic liquid, such as petroleum products, while substantially repelling the water in which the water-insoluble organic liquid is floating.

The fibrous absorbent fabric may be natural or synthetic woven or non-woven textile material. Such materials as cotton, jute, hemp, wool, Rayon, Dacron, paper, polyester, and polyurethane, in various forms and combinations may be used. The fibrous fabric material is formed into sheets, nets, cloths, webbing, films, etc. depending upon the particular application.

The water-repellent composition with which the fibrous absorbent fabric is saturated is an oleophylic, hydrophobic, waterproofing solution, similar to the types used in waterproofing or water sealing wood or concrete. A preferred material is a coating or impregnating composition comprising an oil-in-water emulsion of a water-immiscible liquid as an oil continuous phase, an emulsion of a water insoluble resin in an aqueous medium as the discontinuous phase, and a dispersing agent, such as hydrated starch or a hydrated starch component. One suitable oleophylic, hydrophobic composition of this type is disclosed in Clark U.S. Pat. No. 4,615,739. Any suitable water-repellent composition may be used which is both oleophylic and hydrophobic. Suitable materials having these characteristics are known in the literature.

The water-repellent composition is applied to the fabric by providing a waterseal treatment bath of the water-repellent solution and running the fabric through the bath or by dipping or soaking the fabric in the solution until the fibrous absorbent fabric is saturated. The water-repellent solution will penetrate the fibers of the fabric or form a coating thereon and will dry after a period of time. The fabric can then be rolled up or folded and stored for use. If time is a factor, the fabric can be shipped to a job site in its unsaturated condition and run through waterseal treatment bath at a convenient location. In some applications, such as on a shoreline, the fabric can be deployed or installed at a job site in its unsaturated condition and the water-repellent solution applied after deployment or installation by brushing or spraying the solution onto the fabric.

When a sheet of the saturated absorbent fabric is placed on a body of water-insoluble liquid (for example oil) floating on water, the water-insoluble liquids (oil) will be absorbed into the fabric upon contact therewith and the water in which the oil is floating will be repelled. As explained hereinafter, the captured oil can be reclaimed and re-refined for subsequent use.

Although oil is used as the example in the following description, it should be understood that various other water-insoluble liquids can be absorbed, such as fossil fuels, petroluem products, gasolene, hydraulic fluids, solvents, coolants, and other chemicals.

In a basic form, as seen in FIG. 1, the treated fibrous absorbent fabric 10 is a loosely woven, thin, lightweight cotton fabric, such as cheesecloth or toweling which may be used to remove oil from rocks, plants, and animals. The treated fabric may be provided in large sheets and rolled onto reels and stored on a vessel, offshore oil platform, or shore. As seen in FIG. 2, on a larger scale, the treated fibrous absorbent fabric 10 may be fashioned into a sein or net 11. Additional strips or strands 12 of water-repellent treated fibrous material may be secured to the net to provide additional absorbent surface area to increase the absorbent capacity of the net, similar to streamers or the strands of a mop.

As seen in FIG. 3, a floatation boom 13 can be made using the treated cloth or net fabric 10, wherein a sock-like outer covering of the treated fabric is filled with an absorbent material 14 which is lighter than water. The preferred inner filling 14 is also fibrous material treated with the water-repellent solution, such as wood chips or sawdust, cloth scraps, or other suitable natural or synthetic materials which will float on water. It should be understood that the boom 13 may be constructed using a tubular inflatable bladder or a closed cell foam which is covered by the treated cloth.

Similarly, as seen in FIGS. 4 and 5, blankets or mats 15 can be made using the treated cloth or net fabric 10, wherein a square or rectangular envelope of the treated fabric is filled with an absorbent material 14 which is lighter than water. The preferred inner filling 14 for the mat is also fibrous material treated with the water-repellent solution, such as wood chips or sawdust, cloth scraps, or other suitable natural or synthetic materials which will float on water. The mats 15 may also be formed in a quilted configuration as seen in FIG. 6. The mats can be stacked and bailed for storage and shipping, and be deployed by casting or placing them from a vessel at the site of an oil spill or in an area where the oil is expected to travel. The mats 15 can also be strategically placed by dropping them from an airplane or helicopter.

As shown in FIG. 7, the treated fabric cloths 10 or filled mats 15 can also be placed over the top of a container or pan 16 to serve as a filter whereby water contaminated by petroleum products can be poured through the cloth or mat into the container to capture the water-insoluble liquids (oil) in the treated fibrous cloth or mat. The captured oil can then be reclaimed and re-refined for subsequent use.

FIGS. 8 and 9 show a containment bib net 17. The containment bib net 17 comprises a floatation boom 13 constructed as described above which has a depending skirt portion 18 formed of the treated cloth net material 10. Weights 19 are secured to the bottom of the skirt portion 18 to maintain the net skirt in a depending position. A treated cloth bib portion 20 also formed of the treated cloth or net material 10 is secured at one end to the floatation boom 13 and extends outwardly therefrom to float on the surface of the water and to capture any oil which escapes the boom.

Similarly, as seen in FIGS. 10 and 11, a containment mop net 21 constructed of the treated materials comprises a floatation boom 13 constructed as described above which has a depending skirt portion 18 formed of the treated cloth net material 10. Weights 19 are secured to the bottom of the skirt portion 18 to maintain the net skirt in a depending position. A plurality of strips or strands 22 of water-repellent treated fibrous material 10 are secured to the boom 13 to extend outwardly therefrom to float on the surface of the water and provide to additional absorbent surface area and to capture any oil which escapes the boom. The method of using the containment nets 17 and 21 will be described hereinafter.

Offshore Methods Of Use

Having described several structures incorporating a fibrous absorbent fabric material saturated with a water-repellent composition, the following is a description of the various methods of using such structures to contain and recover the water-insoluble organic liquid floating on water.

The treated cloth or net material is stored in a folded condition or on large reels on an offshore platform or floating vessel. In the event of an oil spill, the cloths or nets unfolded or are spooled off the reels and positioned over the top of the floating oil.

Figure 13:
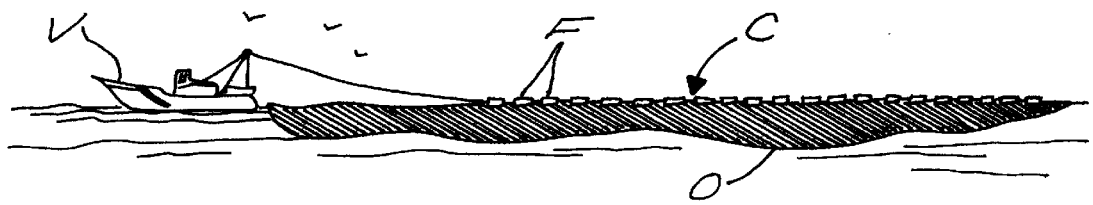
Figure 14:
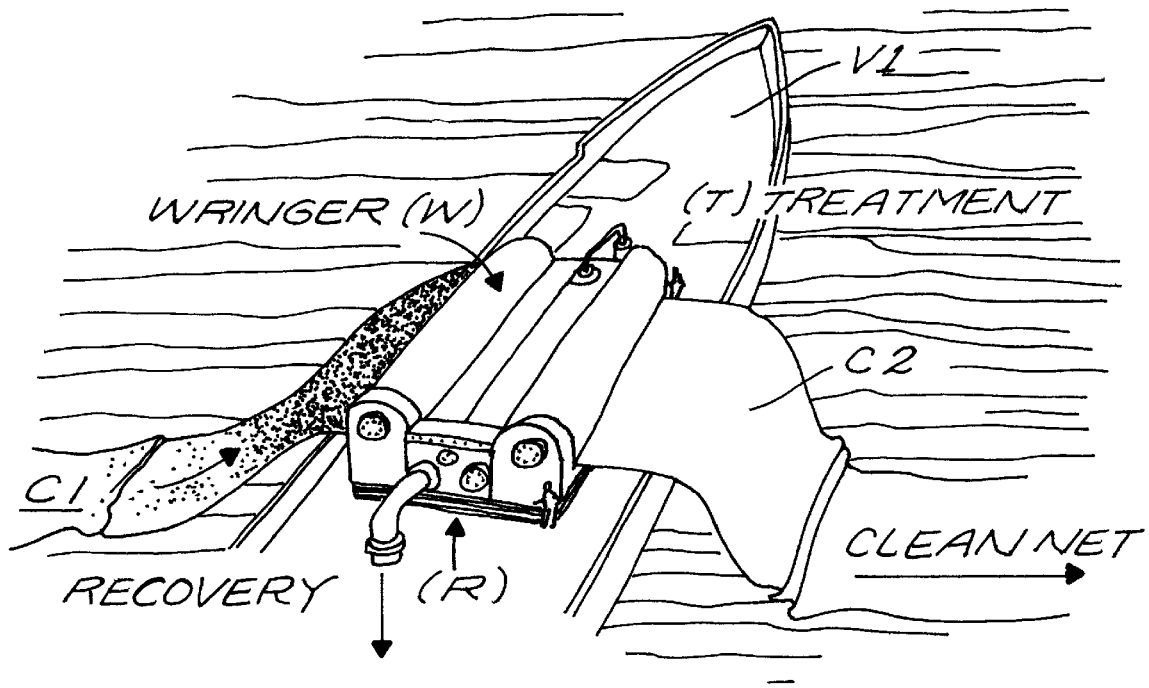
FIG. 14 is a pictorial view showing a vessel having recovery apparatus for separating the oil from the treated fabric material and re-treating the cleaned fabric.

As shown in FIGS. 12, 13, and 14, the cloths or nets C may be provided with floats F along the side edges and/or center to maintain the fabric material near the surface of the water. The cloths or nets C are then pulled by vessels V over or through a section of the floating oil O. Once the oil is absorbed, the cloths or nets are reeled in. They may then be placed on another vessel to be cleaned or otherwise stored for a cleaning operation while another section of the spill is being captured.

As seen in FIG. 14, another vessel V1 may be provided which has recovery apparatus R for separating the oil from the fabric material and re-treating the cleaned fabric. The preferred recovery apparatus R includes a wringer W which receives one end of the contaminated cloth or net C1 and runs it through a pair of rollers to wring out the captured oil. The captured oil is then sent to a storage compartment in the vessel for transportation back to shore to be re-refined. The cleaned cloth or net continues through the recovery apparatus into a treatment portion T where it is saturated with a fresh application of the water-repellent solution. The treated cloth or net C2 is then spooled back onto the reels, or is transported by a tow vessel back to the site of the spill for re-use. The spill may be captured in sections and the process continued until the spill is contained totally.

Figure 15:
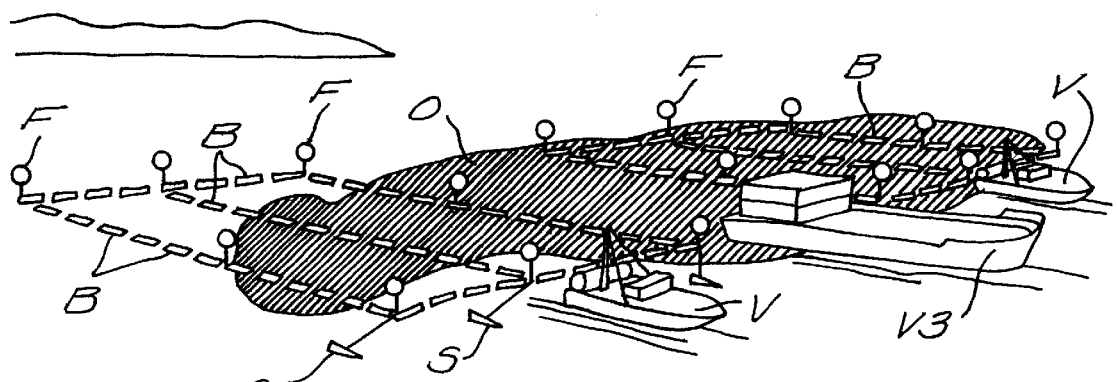
FIGS. 15 and 16 are pictorial views illustrating an oil containment method wherein treated cloths or nets having one or more inflatable tubes or booms along their perimeter are pulled beneath the oil spill by vessels and then inflated to capture a targeted area of floating oil.
Figure 16:
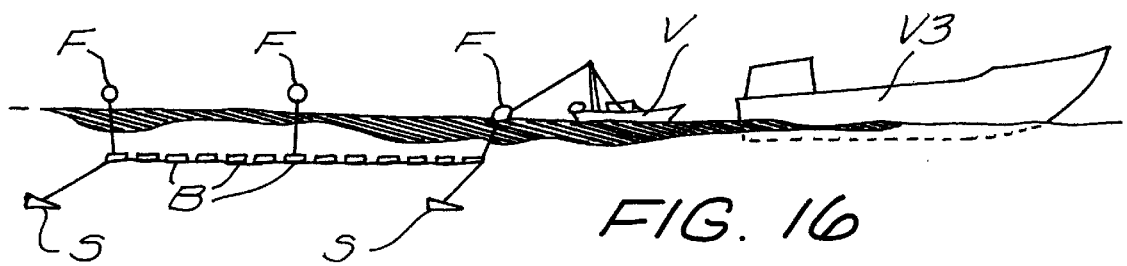

FIGS. 15 and 16 illustrate a method wherein treated cloths or nets C are provided with one or more inflatable tubes or booms B along their perimeter. A series of planer boards or sleds S are connected to the net to pull the nets beneath the surface of the water as they are towed and a series of floats F maintain the nets at a predetermined level below the water surface. The cloth or net C is towed underwater until it is fully stretched beneath the oil spill O to be contained. The inflatable perimeter boom B is then inflated which causes the cloth or net C to rise to the surface thereby capturing the targeted area of the oil. The contained oil can then be recovered immediately, or may be left contained while another section of the spill is being captured.

Figure 17:
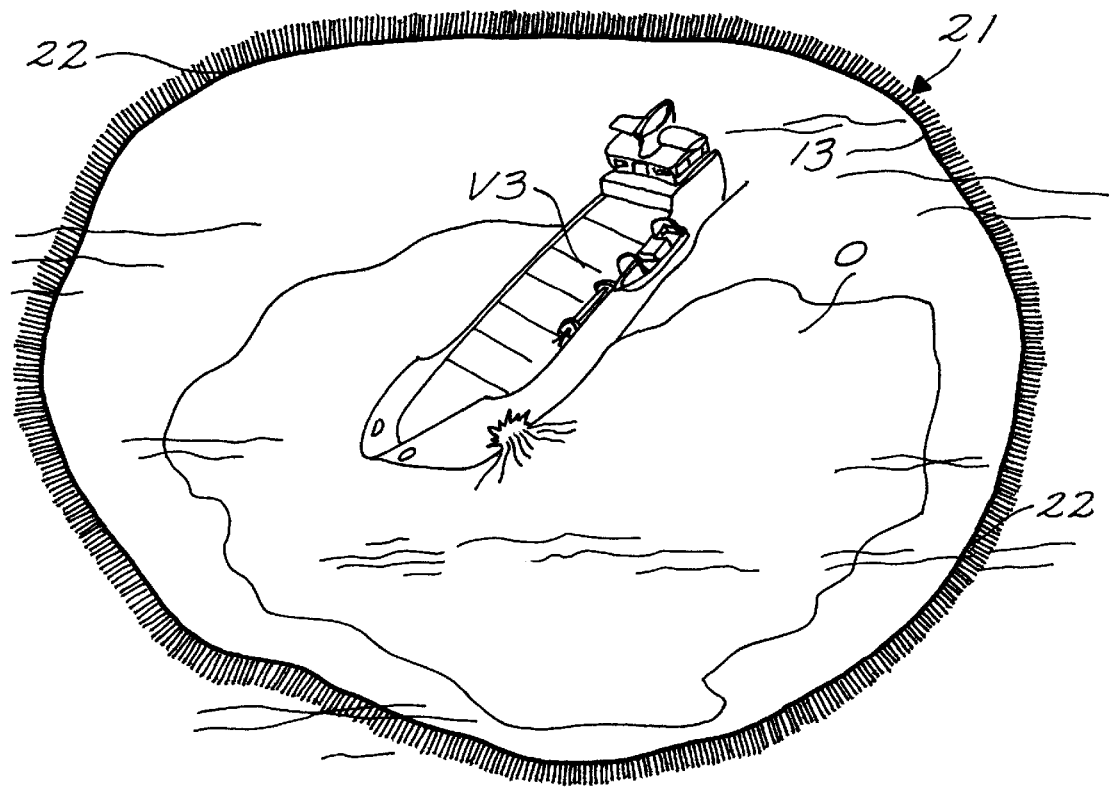
FIG. 17 is a pictorial view illustrating a method of encircling an oil spill with a containment mop net.

FIG. 17 shows one method of using a mop containment net 21 described above with reference to FIGS. 10 and 11. The containment mop net 21 is towed by one or more vessels to encircle the oil spill O issuing from a ruptured or leaking tanker. The floatation boom 13 floats on the water surface and the depending skirt portion having weights secured to the bottom of the skirt portion maintain the net skirt in a depending position below the water surface. The boom and skirt form a "fence" around the oil spill to substantially contain the spill. The strips or strands 22 of water-repellent treated fibrous material extend outwardly from the boom and float on the surface of the water to provide to additional absorbent surface area which will substantially capture any oil which escapes the boom due to the wave action and high winds.

Figure 18:
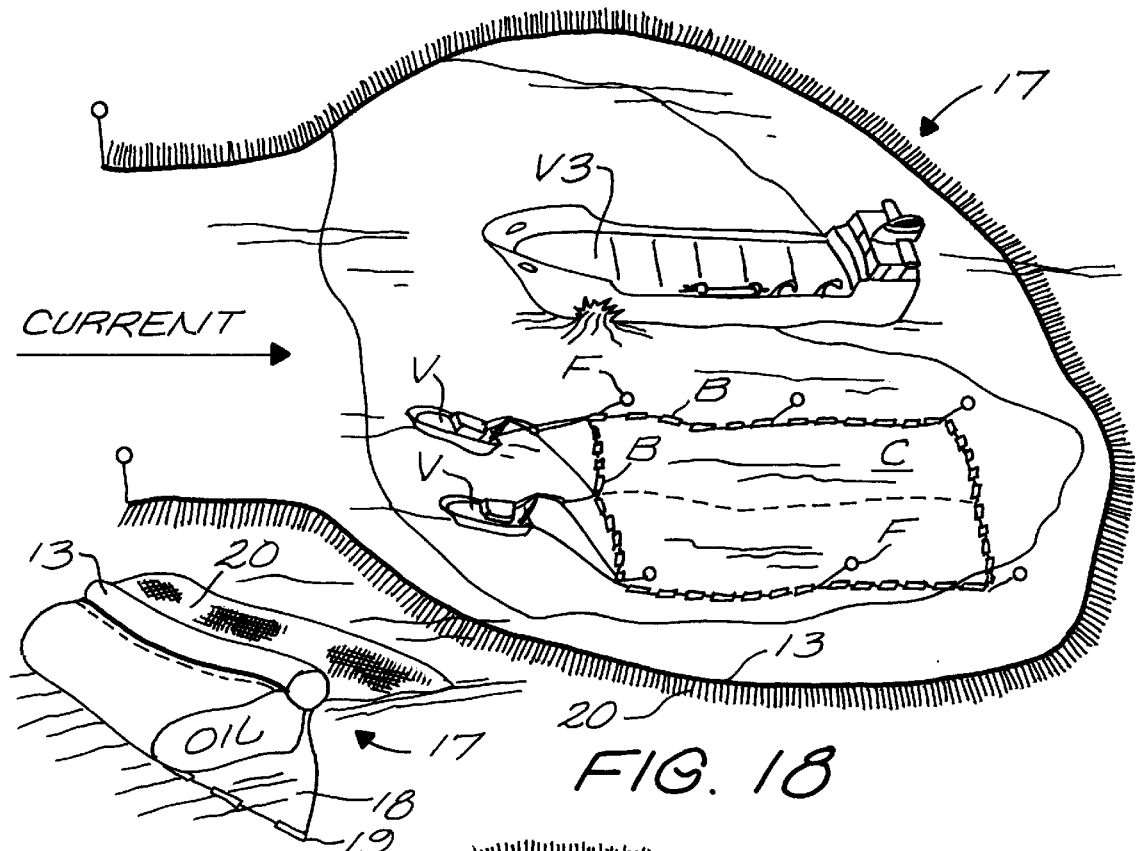
FIG. 18 is a pictorial view illustrating a method of containing an oil spill with a containment bib net and pulling treated cloths or nets beneath a section of floating oil.
Figure 19:
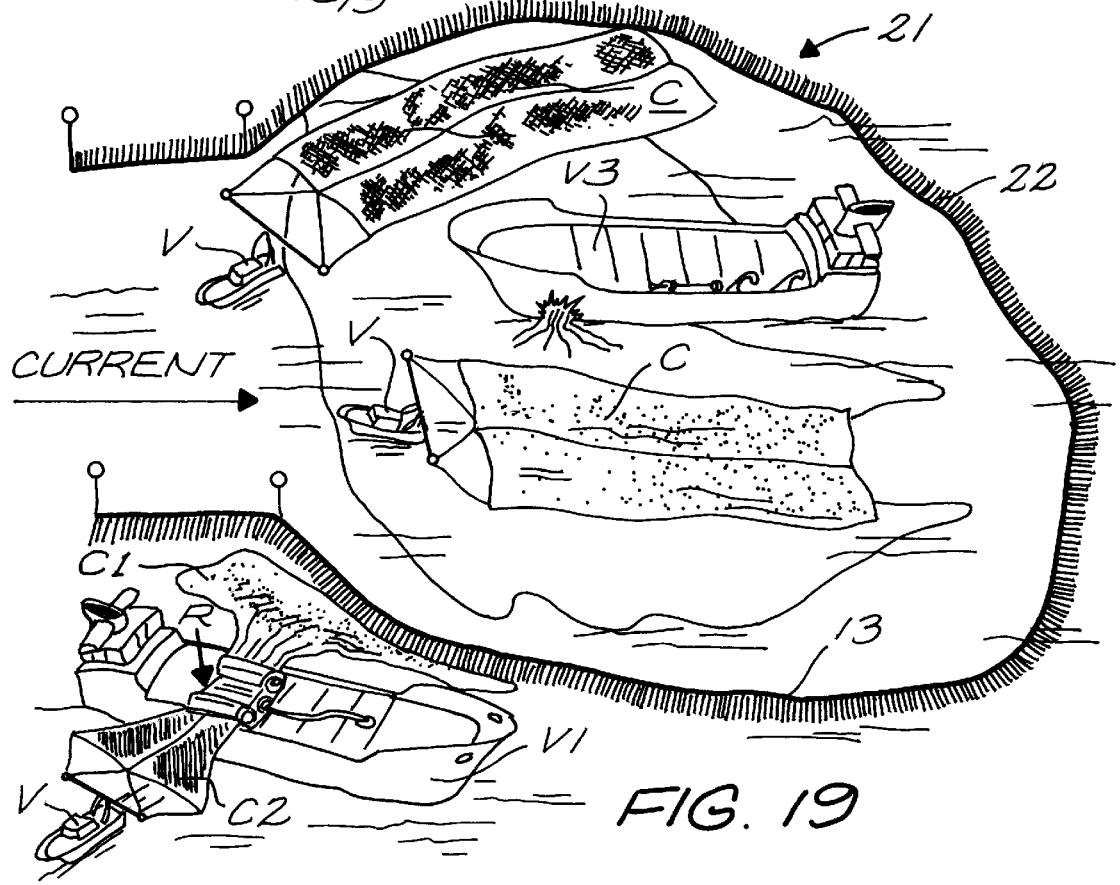
FIG. 19 is a pictorial view illustrating a method of containing an oil spill with a containment mop net and pulling treated cloths or nets over or through a section of floating oil.

FIGS. 18 and 19 illustrate containment and recovery methods using a containment bib net 17 or a mop containment net 21 described above with reference to FIGS. 8–9, and 10–11, respectively, in combination with a treated cloth or net towed by a vessel. The containment bib net 17 or mop net 21 is towed by one or more vessels to partially encircle the oil spill O issuing from a ruptured or leaking tanker V3. The floatation boom 13 floats on the water surface and the depending skirt portion having weights secured to the bottom of the skirt portion maintain the net skirt in a depending position below the water surface. The boom and skirt form a "fence" around the oil spill to substantially contain the spill. The net or "fence" may be left open upstream of the direction of the current to allow recovery vessels V into the enclosure.

In FIG. 18 the treated cloths or nets c are provided with one or more inflatable tubes or booms B along their perimeter and are pulled beneath the surface of the water as they are towed, as previously described with reference to FIGS. 15 and 16. The inflatable perimeter boom B is then inflated which causes the cloth or net C to rise to the surface thereby capturing the targeted area of the oil. The contained oil can then be recovered immediately, or may be left contained while another section of the spill is being captured. The treated cloth bib portion 20 secured to the floatation boom 13 extends outwardly therefrom to float on the surface of the water and captures any oil which escapes the boom. A radar detectable bouy can also be attached to the contained spill and allowed to drift for later recovery.

Similarly, FIG. 19 shows treated cloths or nets C being pulled atop the surface of the water as they are towed, as previously described with reference to FIGS. 12 and 13. The strips or strands 22 of water-repellent treated fibrous material extending outwardly from the containment mop boom 21 float on the surface of the water to provide to additional absorbent surface area which will substantially capture any oil which escapes the boom due to the wave action and high winds. A recovery vessel V1 is shown which has recovery apparatus R for separating the oil from the contaminated fabric material C1 and re-treating the cleaned fabric, as previously described with reference to FIG. 14. The treated cloth or net C2 is then spooled back onto reels, or is transported by a tow vessel back to the site of the spill for re-use. The spill may be captured in sections and the process continued until the spill is contained totally.

FIG. 20 illustrates a method whereby the ruptured or leaking vessel V3 itself may begin containing the spill while awaiting help. The vessel is equipped with one or more treated containment bib or mop nets 17 or 21 stored on a reel on the vessel. Upon detection of leakage of oil, the treated nets are deployed and towed by a tow vessel V to encircle the oil spill O. The tow vehicle V may also be stored for such emergency on the vessel V3. Depending upon the volume of the spill, the leaking vessel may reel in the contaminated nets, or may radio for additional treated nets or tow vessels equipped with same, while the leakage is contained until help arrives.

FIG. 21 illustrates another method whereby the ruptured or leaking vessel V3 itself may begin containing the spill while awaiting help. The vessel V3 is equipped with one or more treated cloths or nets C stored on reels on the vessel and is equipped with a cannon type launcher L which will fire projectiles P to the perimeter of the spill. The projectiles P are attached to the ends of the treated cloths or nets C and carry the cloth or net over the top of the spill O. The spill may be captured in sections and the process continued until the spill is contained totally.

FIG. 22 illustrates still another method whereby the ruptured or leaking vessel V3 itself may begin containing the spill while awaiting help. The vessel is equipped with one or more treated containment bib or mop nets 17 or 21 stored on reels on the vessel and one or more treated cloths or nets C stored on reels on the vessel and is equipped with a cannon type launcher L which will fire projectiles P to the perimeter of the spill. Upon detection of leakage of oil, the cannon type launchers L fire projectiles P to the perimeter of the spill and carry the cloths or nets C over the top of a section of the oil spill O. The treated containment bib or mop nets 17 or 21 are deployed and towed by a tow vessel V to encircle portions of the oil spill not covered by the cloths or nets C. The spill may be captured in sections and the process continued until the spill is contained totally. Depending upon the volume of the spill, the leaking vessel may reel in the contaminated nets, or may radio for additional treated nets or tow vessels equipped with same, while the leakage is contained until help arrives.

Figure 23:
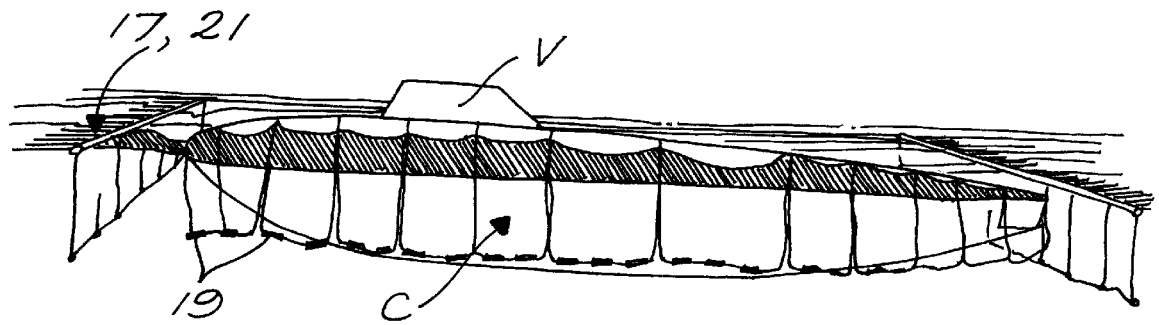
FIG. 23 is a side view illustrating a method of using treated cloths or nets to protect a vessel from becoming contaminated by oil floating on the water.
Figure 24:
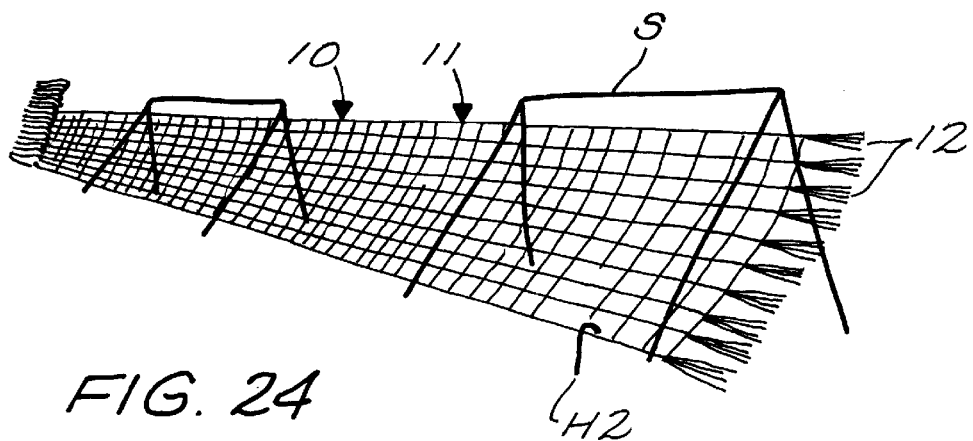
FIGS. 24–27 are pictorial views illustrating a shoreline oil containment method utilizing treated cloths or nets to substantially reduce or prevent spilled oil from contaminating the beach or shoreline.
Figure 25:
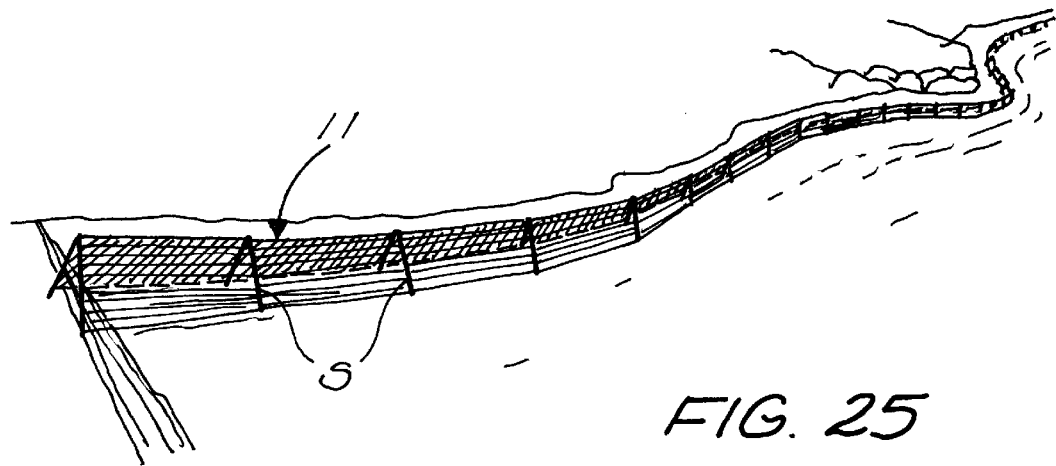
Figure 26:
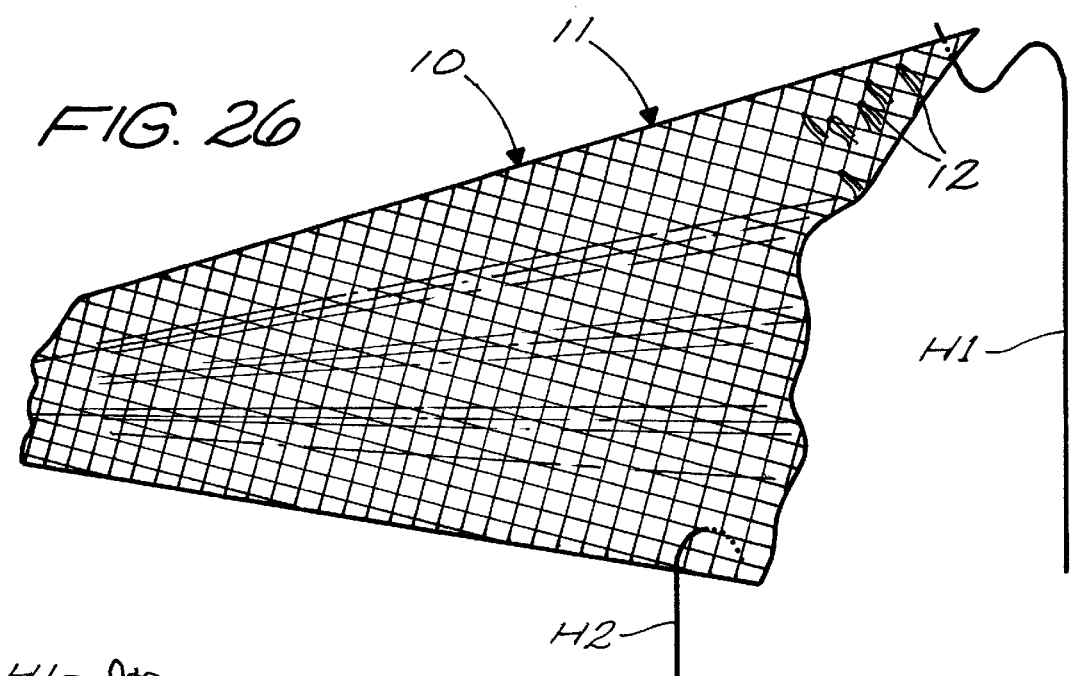
Figure 27:
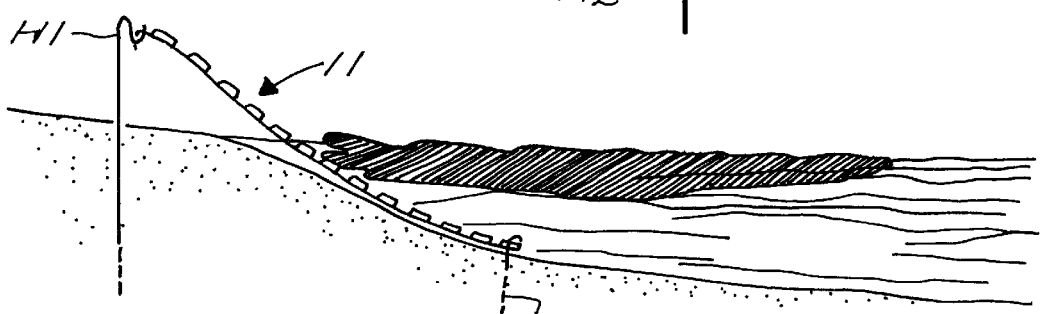

As shown in FIG. 23, the treated cloth or nets C or containment bib or mop nets 17 or 21 may also be used to protect a vessel V from becoming contaminated by oil floating on the water, wherein the treated cloths or nets C, 17, or 21 are secured about the perimeter of a vessel and provided with weights 19 at the bottom to maintain them in position.

Shoreline Methods Of Use

As seen in FIG. 24–27, the treated fibrous absorbent fabric may be used to substantially reduce or prevent spilled oil from contaminating the beach or shoreline. The treated fabric 10 is fashioned into a sein or net 11. Additional strips or strands 12 of water-repellent treated fibrous material may be secured to the net to provide additional absorbent surface area to increase the absorbent capacity of the net, similar to streamers or the strands of a mop. The nets 11 are supported on rigid A-frame support structures S (FIGS. 24 and 25) or by pole hooks H1 (FIGS. 26 and 27) along the shoreline or in the water adjacent the shoreline. The bottom of the nets 11 are anchored by hook members H2 driven into the soil or sand.

As the floating oil is carried onshore by wave and wind action, the oil will be substantially absorbed into the fabric nets upon contact therewith and the water in which the oil is floating will be repelled. The net barriers may be erected in a series of rows to form a series of barriers whereby any oil passing through the first or outermost net barrier will be captured in a subsequent inwardly positioned net. As described previously, the captured oil can be reclaimed and re-refined for subsequent use.

It should be understood that the treated cloths or nets may simply be placed on the sand surface of the shoreline or draped over rocks and plants.

Figure 28:
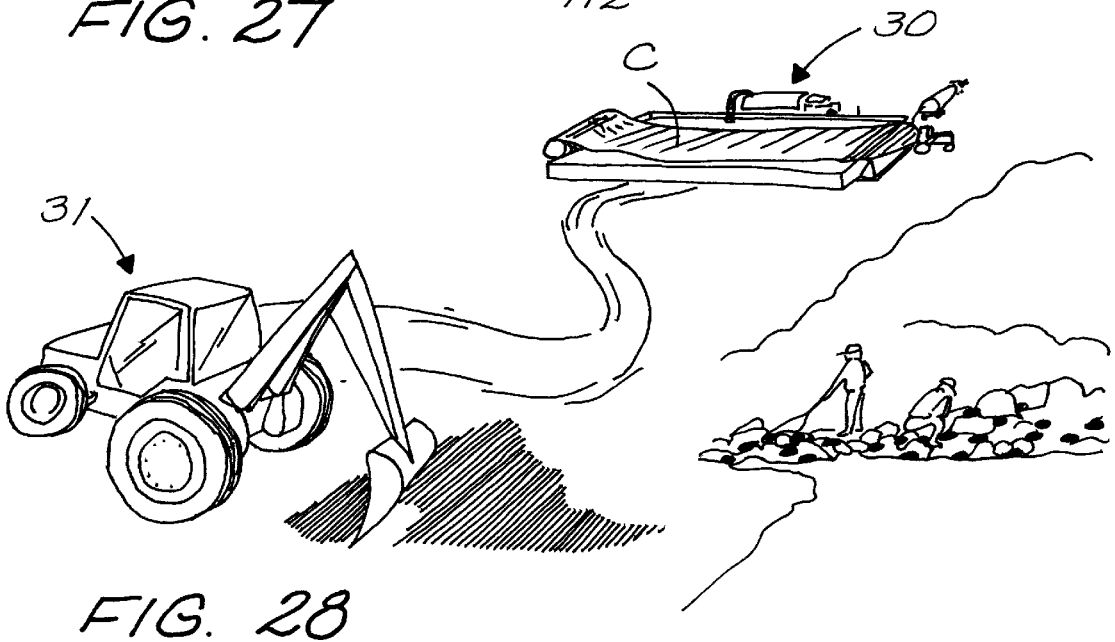
FIG. 28 is a pictorial view illustrating a shoreline clean-up method employing treated cloths or nets to manually remove oil from rocks, plants, and animals and placing one or more reclamation units at the contaminated site which receive contaminated sand and capture the oil.

FIG. 28 illustrates a shoreline clean-up method employing the treated fibrous absorbent fabric. Workers may manually remove oil from rocks, plants, and animals using cloths, toweling, or mops made from the treated fabric. One or more reclamation units 30 may be provided at the site of the contaminated shore for removing the oil from the sand or soil. The reclamation units 30 are a bottomless frame with opposed side walls. The reclamation unit 30 is placed over a section of the contaminated shore or land. The frame is then filled with seawater or available water which may be heated. The water-insoluble liquid (oil) will float to the top. The treated cloths or nets C are stored on a large roll at one end of the frame, and stretched across the top or are otherwise placed on top of the frame such that the cloth or net fabric C absorbs the oil. The treated cloth or net fabric can then be rolled onto a reel at the other end of the reclamation unit. The contaminated roll can then be transported to another location where the captured oil can be reclaimed and re-refined for subsequent use.

Industrial Methods Of Use

The basic structures described above may also be used in industrial applications to absorb, contain, and recover water-insoluble organic liquids which are not floating on water, such as in industrial leaks and spills. For example in manufacturing plants and refineries.

The loosely woven, thin, lightweight treated fabric, in the form of cheesecloth or toweling, as seen in FIG. 1 may be used to remove or wipe oil, solvents, coolants, and other chemicals from leaking pipes, or to clean oily machinery etc.

A smaller version of the boom 13 shown in FIG. 3, may be provided, wherein a sock-like outer covering of the treated fabric is filled with absorbent material 14. The preferred inner filling 14 is also fibrous material treated with the water-repellent solution, such as wood chips or sawdust, cloth scraps, or other suitable natural or synthetic materials. The absorbent booms or socks can be placed in a circle on the floor around a leaking machine or a spill to absorb the leaking liquid and to prevent it from spreading. The excess liquid which is surrounded by the sock may then be soaked up by using a treated cloth or towel.

Similarly, the blankets or mats 15, as shown and described with reference to FIGS. 4, 5 and 6, can also be placed beneath a leaking pipe or machine or on a puddle of the liquid to be absorbed.

As shown in FIG. 7, treated fabric cloths 10 or filled mats 15 can also be placed over the top of a container or pan 16 to serve as a filter and drip pan whereby the covered container can be placed beneath a leaking pipe or machine such that the leaking liquid will pass through the cloth or mat into the container to be captured and reused or reclaimed and re-refined for subsequent use. Treated cloth scraps may also be placed in the containers to facilitate absorption.

While this invention has been described fully and completely with special emphasis upon several preferred embodiments, it should be understood that within the scope of the appended claims the invention may be practiced otherwise than as specifically described herein.

I claim:

1. Apparatus for containment and recovery of water-insoluble liquids floating on water comprising;
    a fibrous absorbent structure comprising a boom having an outer covering of a fibrous absorbent material saturated with an oleophylic, hydrophobic, water-repellent composition and an inner filling lighter than water for floatation and configured to engage the surface of a water-insoluble organic liquid floating on water,
    said boom inner filling comprising an inflatable bladder, whereby
    said fibrous structure will absorb quantities of the water-insoluble organic liquid while substantially repelling the water in which the water-insoluble organic liquid is floating.

2. Apparatus for containment and recovery of water-insoluble liquids floating on water consisting essentially of;
    a fibrous absorbent structure consisting essentially of fabric or netting saturated with an oleophilic, hydrophilic, water-repellent composition, said fibrous structure being a sandwiched mat structure comprising an outer envelope of netting, and an inner filling of material which is lighter than water, and
    configured to engage the surface of a water-insoluble organic liquid floating on water, whereby
    said fibrous structure will absorb quantities of the water-insoluble organic liquid while substantially repelling the water in which the water-insoluble organic liquid is floating.

3. Apparatus according to claim 2 wherein; said inner filling consists essentially of fabric saturated with an oleophilic, hydrophobic, water-repellent composition which will float on water, whereby
    said sandwiched mat structure will absorb quantities of the water-insoluble organic liquid while substantially repelling the water in which the water-insoluble organic liquid is floating.

4. Apparatus for containment and recovery of water-insoluble liquids floating on water consisting essentially of;
    a container having at least one side wall and an open top, and a fibrous absorbent structure consisting essentially of fabric or netting saturated with an oleophilic, hydrophilic, water-repellent composition, being disposed over said open top and configured such that substances containing a water-insoluble organic liquid and water may placed on said fibrous absorbent structure and allowed to pass therethrough, whereby said fibrous structure will absorb quantities of the water-insoluble organic liquid while substantially repelling the water in which the water-insoluble organic liquid is floating.

5. Apparatus for containment and recovery of water-insoluble liquids floating on water consisting essentially of;

a fibrous absorbent structure consisting essentially of fabric or netting saturated with an oleophilic, hydrophilic, water-repellent composition and configured to engage the surface of a water-insoluble organic liquid floating on water, said fibrous structure comprises a boom having an outer covering of said fibrous absorbent material consisting essentially of fabric or netting and an inner filling of material which is lighter than water, and a bib portion formed of said fibrous absorbent material consisting essentially of said fabric or netting secured to extend outwardly from said boom portion when said boom is floating on water to absorb quantities of the water-insoluble organic liquid while substantially repelling the water in which the water-insoluble organic liquid is floating, and a skirt portion formed of said fibrous absorbent material consisting essentially of fabric or netting secured to extend downward from said boom portion when said boom is floating on water to absorb quantities of the water-insoluble organic liquid while substantially repelling the water in which the water-insoluble organic liquid is floating whereby said fibrous structure will absorb quantities of the water-insoluble organic liquid while substantially repelling the water in which the water-insoluble organic liquid is floating.

6. Apparatus for containment and recovery of water-insoluble liquids floating on water consisting essentially of;

a fibrous absorbent structure consisting essentially of fabric or netting saturated with an oleophilic, hydrophilic, water-repellent composition and configured to engage the surface of a water-insoluble organic liquid floating on water, said fibrous structure comprises a boom having an outer covering of said fibrous absorbent material consisting essentially of fabric or netting and an inner filling of material which is lighter than water, a mop portion formed of a plurality of strips of said fibrous absorbent material consisting essentially of fabric or netting secured to extend outwardly from said boom portion when said boom is floating on water to absorb quantities of the water-insoluble organic liquid while substantially repelling the water in which the water-insoluble organic liquid is floating, and a skirt portion formed of said fibrous absorbent material consisting essentially of fabric or netting secured to extend downward from said boom portion when said boom is floating on water to absorb quantities of the water-insoluble organic liquid while substantially repelling the water in which the water-insoluble organic liquid is floating whereby said fibrous structure will absorb quantities of the water-insoluble organic liquid while substantially repelling the water in which the water-insoluble organic liquid is floating.

7. Apparatus for containment and recovery of water-insoluble liquids floating on water comprising;

a fibrous absorbent structure saturated with an oleophylic, hydrophobic, water-repellent composition and configured to engage the surface of a water-insoluble organic liquid floating on water, said fibrous absorbent structure comprising a generally rectangular length of material having selectively inflatable floatation means thereon, whereby said material may be positioned beneath a section of the water-insoluble organic liquid floating on water with said floatation means in a deflated condition, and upon inflation of said floation means, said material is caused to rise to the surface of the water in which the water-insoluble organic liquid is floating, and said fibrous structure will absorb quantities of the water-insoluble organic liquid while substantially repelling the water in which the water-insoluble organic liquid is floating.

8. Apparatus for containment of leaks and spills of water-insoluble liquids comprising, a fibrous absorbent structure consisting essentially of fabric or netting saturated with an oleophilic, hydrophobic, water-repellent composition and configured to be placed in contact with a spilled or leaking water-insoluble liquid, said fibrous structure is a sandwiched mat structure comprising an outer envelope of said fibrous absorbent structure consisting essentially of fabric or netting, and an inner filling of absorbent material consisting essentially of fabric or netting, whereby said fibrous structure will absorb quantities of the water-insoluble organic liquid.

9. Apparatus for containment of leaks and spills of water-insoluble liquids consisting essentially of, a fibrous absorbent structure consisting essentially of fabric or netting saturated with an oleophilic, hydrophobic, water-repellent composition and configured to be placed in contact with a spilled or leaking water-insoluble liquid, a container having at least one side wall, a bottom wall, and an open top configured to be placed beneath a leaking object, and said fibrous absorbent structure consisting essentially of fabric or netting being disposed over said open top such that leaking substances containing a water insoluble organic liquid will contact, whereby said fibrous structure will absorb quantities of the water-insoluble organic liquid.

10. Apparatus according to claim 9 additionally including a fibrous absorbent material consisting essentially of fabric or netting inside said container which is saturated with an oleophilic, hydrophobic, water-repellent composition.

* * * * *